(12) United States Patent
Grumm et al.

(10) Patent No.: US 6,254,285 B1
(45) Date of Patent: Jul. 3, 2001

(54) ELECTROOPTICAL MODULE

(75) Inventors: Mathias Grumm; Bernd Hanke; Frank Meyer-Güldner; Oliver Ölze, all of Berlin; Andreas Steffensen, Kleinmachnow, all of (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/258,939

(22) Filed: Mar. 1, 1999

Related U.S. Application Data

(63) Continuation of application No. PCT/DE97/01955, filed on Aug. 28, 1997.

(30) Foreign Application Priority Data

Aug. 28, 1996 (DE) ............................................. 196 36 238
Sep. 27, 1996 (DE) ............................................. 196 41 393

(51) Int. Cl.⁷ ................................. G02B 6/42; G02B 6/36
(52) U.S. Cl. ................................................. 385/88; 385/92
(58) Field of Search ........................................ 385/88–94

(56) References Cited

U.S. PATENT DOCUMENTS 5,715,099 * 2/1998 Takemoto ............................. 359/819

FOREIGN PATENT DOCUMENTS

| 27 47 773 A1 | 6/1978 | (DE) . |
|---|---|---|
| 31 38 197 A1 | 6/1983 | (DE) . |
| 43 11 980 C1 | 6/1994 | (DE) . |
| 0 351 211 A2 | 1/1990 | (EP) . |
| 0 504 569 A2 | 9/1992 | (EP) . |

OTHER PUBLICATIONS

International Application WO 94/04955 (Meadowcroft), dated Mar. 3, 1994.

International Application WO 94/19718 (Meadowcroft), dated Sep. 1, 1994.

International Application WO 97/21229 (Bayer et al.) dated Jun. 12, 1997.

"Delo Technical Info" VE 293 (No date available).

* cited by examiner

*Primary Examiner*—Rodney Bovernick
*Assistant Examiner*—Michael Stahl
(74) *Attorney, Agent, or Firm*—Herbert L. Lerner; Laurence A. Greenberg; Werner H. Stemer

(57) ABSTRACT

On a front side, a module has a coupling socket for holding an optical fiber end, and at a rear side the module has a holding region in which an electrooptical component is fixed. A joint gap, filled with an adhesive, between the component and the holding region extends in a plane which is oriented perpendicular to the longitudinal axis of the coupling socket. The component and/or the holding region is provided with openings, which lead to the joint gap and taper toward the joint gap, and are introduced into the adhesive.

7 Claims, 3 Drawing Sheets

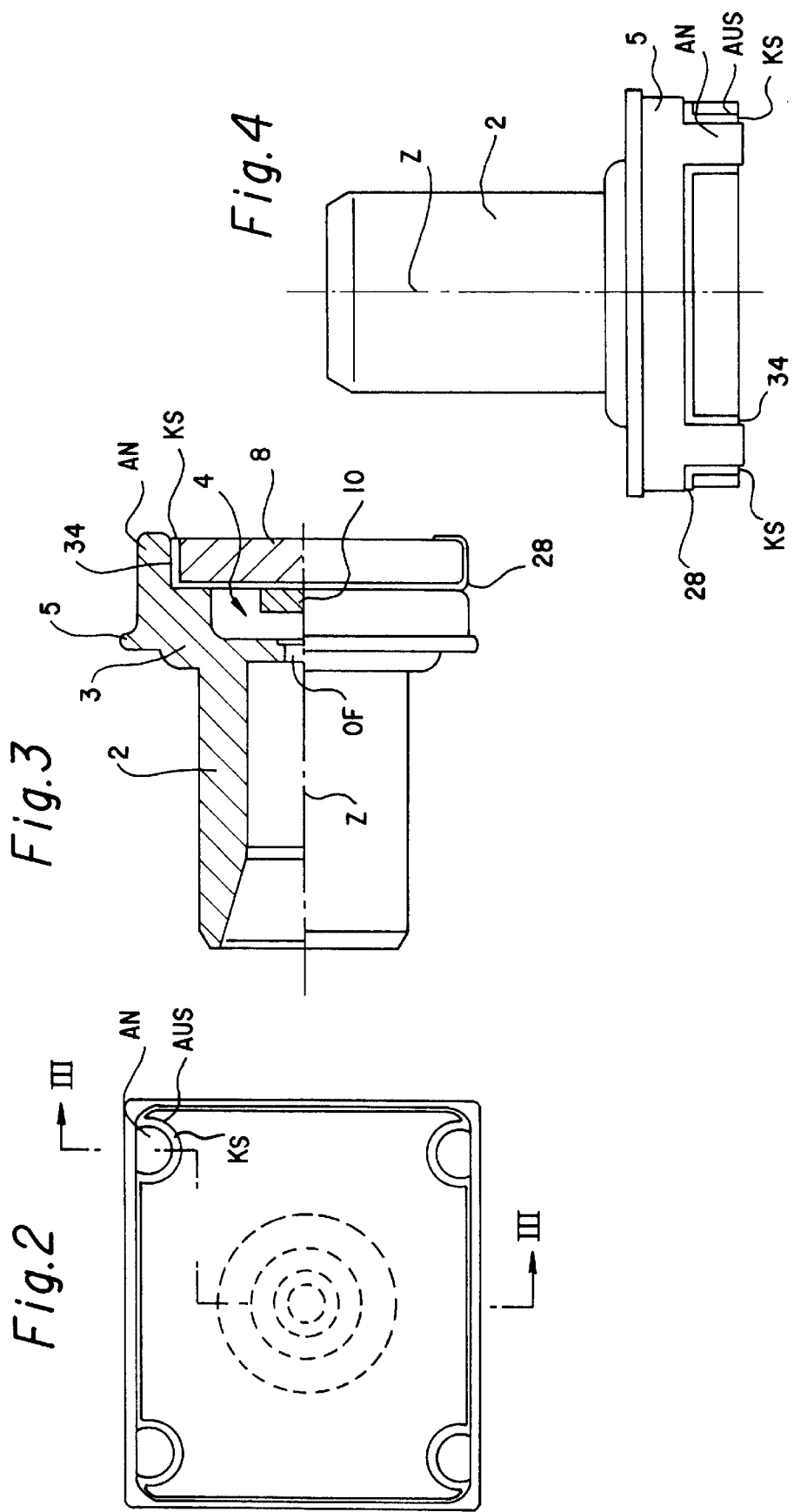

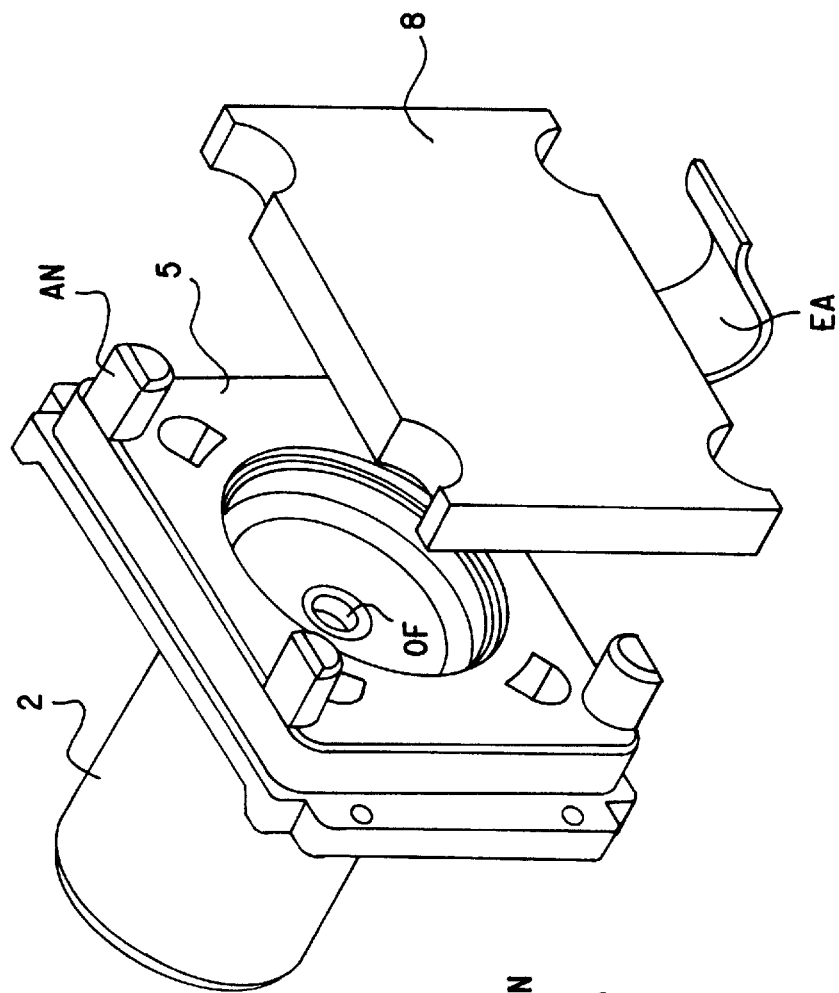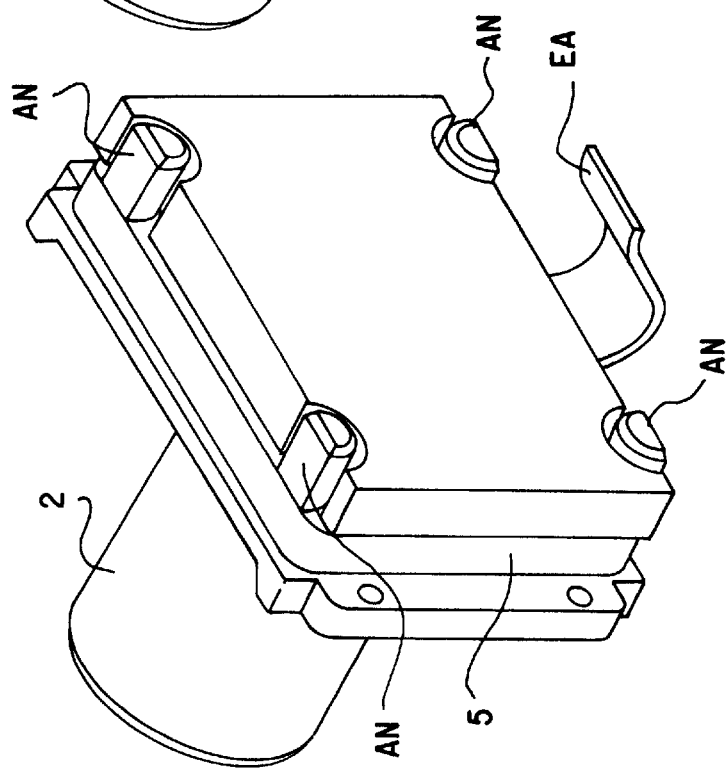

ELECTROOPTICAL MODULE

CROSS-REFERENCE TO RELATED APPLICATION

This is a continuation of copending International Application PCT/DE97/01955, filed Aug. 28, 1997, which designated the United States.

BACKGROUND OF THE INVENTION

Field of the Invention

The invention is in the field of optically coupling an electrooptical transmitter or an optoelectronic receiver, also denoted below as an electrooptical transducer or an electrooptical component, to a coupling partner (e.g. an optical fiber end). The invention further relates to an electrooptical module that has on a front side a coupling socket for holding an optical fiber end, and at a rear side a holding region for an electrical component. The component is fixed by an adhesive that is introduced into a joint gap, extending perpendicular to the longditudinal axis of the coupling socket, between the holding region and the electrooptical component and/or a component carrier.

Such a module is disclosed in Published, Non-Prosecuted German Patent Application DE 31 38 197 A1 and includes a coupling part having a coupling socket into which a capillary with an optical fiber end running centrally in the direction of the capillary longitudinal axis can be inserted for the purpose of optical coupling to an electrooptical component. Provided on the side opposite the socket is a holding region for an electrooptical component whose housing is fixed on the side by an adhesive. The adhesive is located in this configuration in a joint gap that extends perpendicular to the longitudinal axis of the coupling socket. The stability of the adhesive connection is comparatively low against mechanical and thermal tensile or shear loads, and this can disadvantageously affect the coupling efficiency.

SUMMARY OF THE INVENTION

It is accordingly an object of the invention to provide an electrooptical module that overcomes the above-mentioned disadvantages of the prior art devices of this general type, in which a high coupling efficiency is ensured which is stable in the long term and as far as possible independent of changes in external conditions.

With the foregoing and other objects in view there is provided, in accordance with the invention, an electrooptical module, including: a front side; a coupling socket disposed on the front side for holding an optical fiber end and having a longitudinal axis; a rear side; a holding region disposed at the rear side and connected to the coupling socket; an electrooptical component disposed in the holding region; a component carrier connected to the electrooptical component, the holding region and at least one of the component carrier and the electrooptical component having a joint gap formed therebetween, the joint gap between the holding region and at least one of the component carrier and the electrooptical component extending perpendicular to the longitudinal axis of the coupling socket; an adhesive disposed in the joint gap for fixing in place the electrooptical component; and at least one of the electrooptical component, the component carrier and the holding region having openings formed therein, the openings leading to the joint gap, tapering toward the joint gap, and receiving the adhesive disposed in the joint gap.

The object is achieved according to the invention in the case of a module of the type mentioned at the beginning by virtue of the fact that the electrooptical component and/or the component carrier and/or the holding region is provided with openings which lead to the joint gap and taper toward the joint gap, and are introduced into the adhesive.

A substantial advantage of the module according to the invention consists in its increased stability, in particular against thermal cycling, because the connection between the component or the component carrier and the holding region is strengthened by the adhesive self-closure in the openings. Mechanical or thermal loads therefore cannot so easily lead to a deviation from the original optimum component position. A further advantage of the module according to the invention consists in the comparatively simple application and the accessibility, which promotes the adhesive curing, of the adhesive in the openings. To be precise, the adhesive can advantageously be spread in a single work operation over the surface of the holding region that is perpendicular to the longitudinal axis of the coupling socket or to the optimum axis, and subsequently enters the openings.

In order to permit an eccentric offset, possibly produced during the adjustment, between the electrooptical component or its component carrier and the holding region to be compensated and, furthermore, to permit communication of the openings, according to an advantageous development of the invention the openings of the electrooptical component and/or of the component carrier, on the one hand, and the openings of the holding region, on the other hand, have different widths on the joint gap side.

A development of the invention which is preferred in terms of production engineering and in mechanical terms consists in that the component is held by an annular component carrier which is disposed opposite a flange of the holding region with the formation of the joint gap.

It is preferred in terms of production engineering to use an adhesive that can be cured both by light and by heat. The compositions disclosed in Published, Non-Prosecuted German Patent Application 195 45 552 A dated Jun. 12, 1995 and those in Published European Application EP 0 504 569 A2 as well as the two-component adhesive marketed under the trade name of DELO-DUOKATÒ VE 293 by DELO Industrieklebstoffe GmbH & Co. KG, Ohmstr. 3, 86899 Landsberg, Germany, have proved to be particularly suitable for this purpose. The openings can advantageously permit additional access of light for the purpose of optical curing of the adhesive.

In order to provide the electrooptical module with a mechanically particularly firm connection of the electrooptical component to the coupling socket and/or the holding region thereof, according to a preferred embodiment of the invention, it is provided that, between at least one tongue and at least one cutout of the holding region of the coupling socket and electrooptical component, at least one adhesive gap aligned parallel to the longitudinal axis of the coupling socket borders on the joint gap with a gap width which permits the electrooptical component to be aligned into a position of maximum optical coupling.

In the case of the module according to the invention, the at least one tongue on the holding region of the coupling socket or on the electrooptical component, and the at least one cutout can correspondingly be provided on the electrooptical component or on the holding region. However, it is also possible to provide in each case more than one tongue and more than one cutout if this is permitted by the structural and optical requirements placed on the electrooptical module.

It is regarded as particularly advantageous when the holding region of the coupling socket is provided on its outer edge with a plurality of tongues in the form of pins, and the electrooptical component is provided on its outer edge with cutouts which are flush with the pins in the mounted state.

To be specific, the result of this is that relatively large regions of the adhesive gaps can be exposed to the light, and this is necessary for prefixing the adhesive used by means of optical curing.

Other features which are considered as characteristic for the invention are set forth in the appended claims.

Although the invention is illustrated and described herein as embodied in an electrooptical module, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a top plan view of a second embodiment of the module;

FIG. 3 is a sectional view through the second embodiment of the module taken along the line III—III shown in FIG. 2;

FIG. 4 is a side-elevational view of the second embodiment of the module;

FIG. 5 is a perspective view of the second embodiment of the module; and

FIG. 6 is an exploded, perspective view of the second embodiment of the module.

DESCRIPTION OF THE PREFERRED EMBODIMENTS

Figure 1:
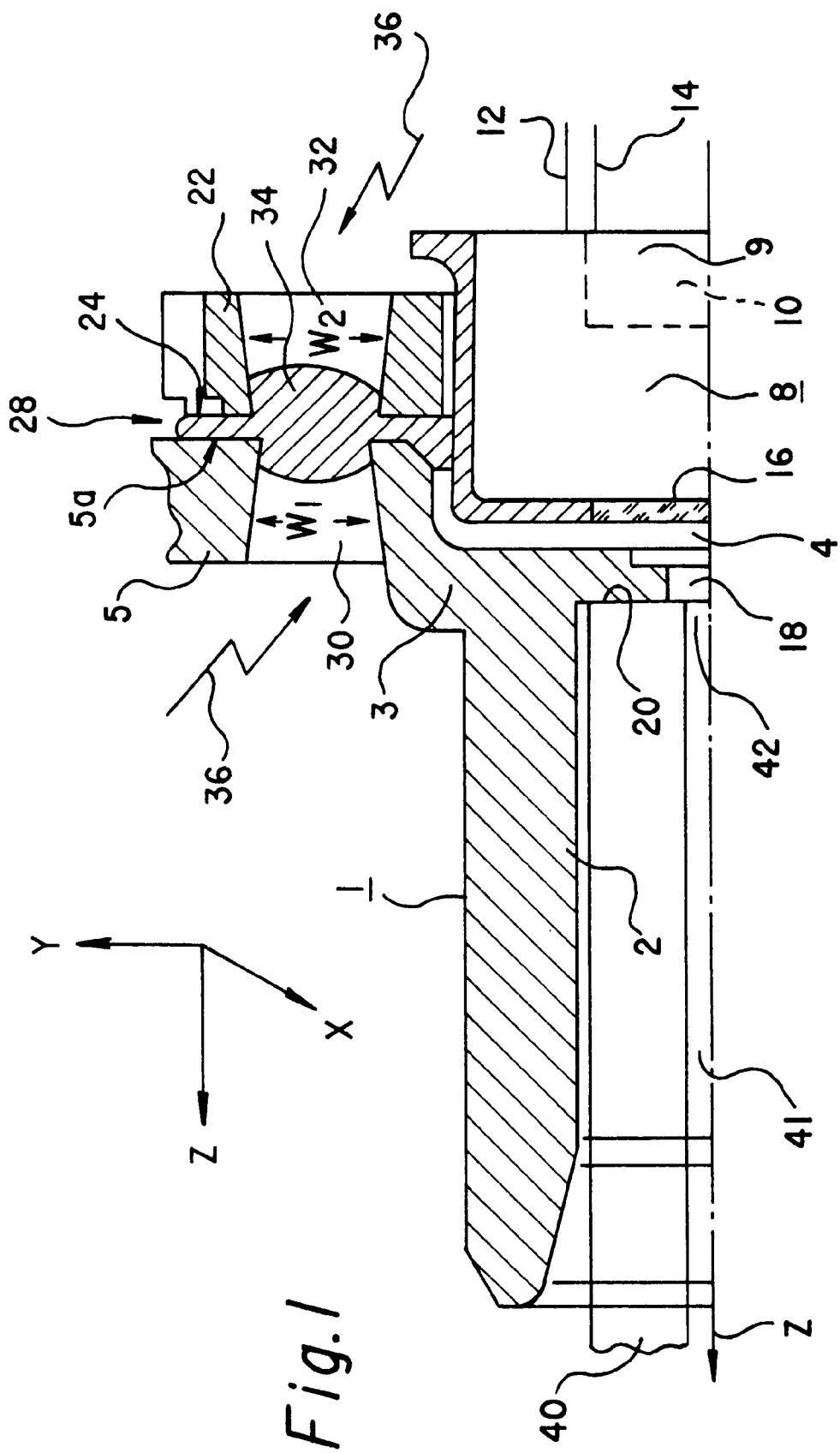
FIG. 1 is a diagrammatic, fragmentary, longitudinal sectional view of a first embodiment of a module according to the invention.

In all the figures of the drawing, sub-features and integral parts that correspond to one another bear the same reference symbol in each case. Referring now to the figures of the drawing in detail and first, particularly, to FIG. 1 thereof, there is shown a partial longitudinal section of a first electrooptical module according to the invention. The module includes a coupling part 1 which has in a front region a coupling socket 2 for holding an optical fiber plug 40 with a centrally running optical fiber 41 having an end 42. The coupling part 1 has at its rear end a holding region 3 that includes a depression 4 and a radial flange 5 for holding or fixing an electrooptical component 8. The component 8 has a housing 9 for holding a further electrooptical component (shown in outline in the form of a laser diode 10) which can be driven via electric connections 12, 14 for the purpose of emitting light signals. Via a lens or a window 16, light signals can enter through a bore 18 in a stop 20 for the optical fiber plug 40 into the optical fiber end 42 held by the latter. The component 8 or the housing 9 thereof is surrounded by a component carrier in the form of a ring 22 which is in the shape of a plate and one surface 24 of which faces a corresponding surface 5a of the flange 5 at a spacing with the formation of a joint gap 28. The ring 22 and the flange 5 each preferably contain a plurality of conical openings 30, 32 that are distributed over the circumference, are essentially aligned, and taper toward the joint gap 28. The openings 30, 32 have different widths W1, W2, with the result that they continue to communicate even in the case of an eccentric offset produced during the subsequent adjustment. The joint gap 28 extends in a plane X-Y that is orientated perpendicular to the optical axis or to a longitudinal axis Z of the coupling socket 2.

The optical fiber plug 40 that coaxially surrounds the end 42 of the optical fiber 41 is inserted into the coupling socket 2 for the purpose of mounting and of actively adjusting the module. The other end of the optical fiber 41 is connected to an optical receiver for determining the intensity of the optical signals launched into the optical fiber end 42. A layer of an adhesive 34 that can be cured both by light and by heat is applied to the surface 5a of the flange 5. Subsequently, the component 8 is inserted into the depression 4 so far that the component carrier 22 adjoins with its upper side 24 the joint gap 28 filled with adhesive. Small quantities of the adhesive 34 in this case enter the openings 30, 32 from the joint gap 28. During the subsequent active adjustment, electric signals are applied via the connections 12, 14 to the laser diode 10 which consequently emits light signals. The light signals are launched into the optical fiber end 42 via the window 16 and the bore 18. While the intensity of the launched light is being evaluated, the component 8 is moved in the X-Y plane and in the Z-direction until a position of maximum intensity (optimum coupling efficiency) is reached. As indicated by arrows 36, in this position the adhesive 34 is irradiated for the purpose of curing with UV light which additionally also reaches the joint gap 28 through the openings 30, 32. Subsequently, the adhesive 34 is subjected to thermal curing, which can advantageously be performed in a separate device by the previously performed curing by optical irradiation, and is completely cured in the process.

After complete curing, the connection between the component carrier 22 and flange 5 is essentially via the joint gap 28 orientated perpendicular to the Z axis. The connection is additionally strengthened by the self-closure of the adhesive in the openings 30, 32. Radially, the joint gap 28 and thus the distribution of adhesive 34 have no significant material symmetries, with the result that, in the case of thermal loads, in particular, a loading which is to the greatest possible extent symmetrical, and thus does not impair the coupling conditions, predominates in the module according to the invention. In addition to a comparatively simple application of the adhesive and therefore a simplified capacity for production, the module according to the invention is consequently distinguished by a coupling characteristic that is stable in the long term and not impaired by changes in temperature.

As is shown, in particular, by FIGS. 2 to 4, a second embodiment of the module according to the invention also includes the coupling socket 2 for holding the optical fiber plug 40, in whose central bore one end 42 of the optical fiber 41 is disposed in the usual way. The coupling socket 2 is provided in one piece with the holding region 3 disposed in the rear that serves to hold the electrooptical component 8. The holding region 3 is provided with the radially outwardly extending flange 5, as is also shown by FIGS. 5 and 6.

The electrooptical component 8 is constructed in the shape of a plate in the example represented and has the optical transmitter 10 (see FIG. 3) which can be constructed as a laser diode. The optical transmitter 10 can be driven via electric connections EA (compare FIGS. 5 and 6). The optical transmitter 10 then emits light signals that can be launched via an opening OF in the holding region 3 containing a lens, if appropriate, into the end 42 of the optical fiber 41.

In addition to the joint gap 28 described in detail in connection with FIG. 1, in the case of the electrooptical module according to FIGS. 2 to 6 there are provided on the edge of the flange 5 of the coupling socket 2 four pins AN which extend parallel to the longitudinal axis Z of the coupling socket 2. The pins AN engage in the mounted state, as is shown, in particular, by FIGS. 4 and 5, in cutouts AUS on the edge of the electrooptical component 8. In this configuration, the pins AN are dimensioned with regard to the cutouts AUS so as to produce in each case an adhesive gap KS the width of which is selected such that when the electrooptical module is mounted it permits alignment into a position of maximum optical coupling.

When the electrooptical module according to the invention is produced, it is not only the joint gap 28 which is provided with an adhesive 34 which can be cured both by light and by heat, but also the respective adhesive gap KS. Because of the use of such an adhesive 34, it is possible to undertake prefixing by optical curing after alignment of the coupling socket 2 with reference to the electrooptical component 8 not only in the region of the joint gap 28, but also in the region of the adhesive gap KS, because the light has good access to the adhesive gap KS. Subsequently, thermal curing is performed, so that the electrooptical module with its coupling socket and with the electrooptical component 3 is then joined together permanently and very firmly in mechanical terms.

We claim:

1. An electrooptical module, comprising:
   a front side;
   a coupling socket disposed on said front side for holding an optical fiber end and having a longitudinal axis;
   a rear side;
   a holding region disposed at said rear side and connected to said coupling socket;
   an electrooptical component disposed in said holding region;
   a component carrier connected to said electrooptical component, said holding region and at least one of said component carrier and said electrooptical component having a joint gap formed therebetween, said joint gap between said holding region and at least one of said component carrier and said electrooptical component extending perpendicular to said longitudinal axis of said coupling socket;
   an adhesive disposed in said joint gap for fixing in place said electrooptical component; and
   at least one of said electrooptical component, said component carrier and said holding region having openings formed therein, said openings leading to said joint gap, tapering toward said joint gap, and receiving said adhesive disposed in said joint gap.

2. The electrooptical module according to claim 1, wherein said openings formed in said electrooptical component and said component carrier on a side next to said joint gap have a different width than a width of said openings formed in said holding region on a side next to said joint gap.

3. The electrooptical module according to claim 1, wherein said holding region has a flange, said component carrier securing said electrooptical component is an annular component carrier disposed opposite said flange of said holding region with said joint gap therebetween.

4. The electrooptical module according to claim 1, wherein electrooptical component has at least one cutout formed therein, said holding region has at least one tongue extending into said at least one cutout, said at least one tongue and said at least one cutout defining an adhesive gap formed therebetween, said adhesive gap aligned parallel to said longitudinal axis of said coupling socket, borders on said joint gap, and has a gap width permitting said electrooptical component to be aligned into a position of maximum optical coupling.

5. The electrooptical module according to claim 4, wherein said holding region has an outer edge, said at least one tongue is one of a plurality of tongues in a form of pins disposed on said outer edge of said holding region, said electrooptical component has an outer edge and said at least one cutout is one of a plurality of cutouts formed in said electrooptical component at said outer edge, each of said plurality of cutouts having a depth such that said pins are flush with said outer edge of said electrooptical component.

6. An electrooptical module, comprising:
   a front side;
   a coupling socket disposed on said front side for holding an optical fiber end and having a longitudinal axis;
   a rear side;
   a holding region disposed at said rear side and connected to said coupling socket;
   an electrooptical component disposed in said holding region;
   said holding region and said electrooptical component having a joint gap formed therebetween, said joint gap between said holding region and said electrooptical component extending perpendicular to said longitudinal axis of said coupling socket;
   an adhesive disposed in said joint gap for fixing in place said electrooptical component; and
   at least one of said electrooptical component and said holding region having openings formed therein, said openings leading to said joint gap, tapering toward said joint gap, and receiving said adhesive disposed in said joint gap.

7. An electrooptical module, comprising:
   a front side;
   a coupling socket disposed on said front side for holding an optical fiber end and having a longitudinal axis;
   a rear side;
   a holding region disposed at said rear side and connected to said coupling socket;
   an electrooptical component disposed in said holding region;
   a component carrier connected to said electrooptical component, said component carrier and said holding region having a joint gap formed therebetween, said joint gap between said component carrier and said holding region extending perpendicular to said longitudinal axis of said coupling socket;
   an adhesive disposed in said joint gap for fixing in place said electrooptical component; and
   at least one of said component carrier and said holding region having openings formed therein, said openings leading to said joint gap, tapering toward said joint gap, and receiving said adhesive disposed in said joint gap.

* * * * *